US007546213B1

(12) United States Patent
Skovenborg et al.

(10) Patent No.: US 7,546,213 B1

(45) Date of Patent: Jun. 9, 2009

(54) AUDIO VISUALIZER

(75) Inventors: Esben Skovenborg, Aarhus C (DK); Ivar Iversen, Aarhus C (DK); Søren Henningsen Nielsen, Lystrup (DK)

(73) Assignee: The TC Group A/S (DK)

( * ) Notice: Subject to any disclaimer, the term of this patent is extended or adjusted under 35 U.S.C. 154(b) by 393 days.

(21) Appl. No.: 11/246,887

(22) Filed: Oct. 7, 2005

(51) Int. Cl.
*G06T 11/20* (2006.01)

(52) U.S. Cl. ........................................ 702/48; 345/440

(58) Field of Classification Search ....................... None
See application file for complete search history.

(56) References Cited

U.S. PATENT DOCUMENTS

2002/0183642 A1* 12/2002 Murphy ...................... 600/532

OTHER PUBLICATIONS

Windows Media Player, Version 10.00.00.3646. Microsoft Corporation 1992-2004. Portions Copyright(c) 2002 SRS Labs, Inc.*

* cited by examiner

*Primary Examiner*—Bryan Bui
*Assistant Examiner*—Jonathan Teixeira Moffat
(74) *Attorney, Agent, or Firm*—Cantor Colburn LLP

(57) ABSTRACT

The invention relates to a loudness meter including display means and data-processing means where the data-processing means establishes loudness estimates on the basis of an input signal, a first part of the loudness meter indicating a current loudness estimate on the display means, a further part of the loudness meter indicating a time window of previous loudness estimates on the display means.

26 Claims, 5 Drawing Sheets

AUDIO VISUALIZER

FIELD OF THE INVENTION

The invention relates to a loudness meter.

SUMMARY OF THE INVENTION

The invention relates to a loudness meter comprising display means DM and data-processing means DP wherein said data-processing means DP establishes loudness estimates on the basis of an input signal IS, a first part FIP of said loudness meter indicating a current loudness estimate CLE on said display means DM, a further part FUP of said loudness meter indicating a time window of previous loudness estimates PLE on said display means DM.

According to a preferred embodiment of the invention, the loudness meter comprises one single unit. According to a further embodiment, the functions of the loudness meter may be distributed between different and separated devices.

In an embodiment of the invention, said current loudness estimate CLE is established by said data-processing means on the basis of a first loudness estimation algorithm and said previous loudness estimate PLE is established by said data-processing means on the basis of a further loudness estimation algorithm.

According to an embodiment of the invention, different algorithms may be applied for the purpose of displaying current loudness estimates and previous loudness estimates. In other words, one type of loudness calculation may be relevant to the current loudness estimate, typically a short-term loudness estimate based on perceptual algorithms or even electrical level-based algorithms, whereas long-term algorithms may estimate loudness based on longer periods of time or a completely different loudness determination.

In an embodiment of the invention said current loudness estimate CLE is established by said data-processing means on the basis of a short-term loudness estimation algorithm and said previous loudness estimate PLE is established by said data-processing means on the basis of a long-term loudness estimation algorithm.

In an embodiment of the invention said loudness meter comprises means for scrolling the time window of previous loudness estimates PLE and wherein the indicated current loudness estimate CLE corresponds to a loudness estimate at the time defined by said means for scrolling.

According to a further embodiment of the invention, a user may scroll the time window of previous loudness estimates PLE and at the same time obtain that the displaying of the current loudness estimate CLE tracks the scrolling of the time reference. This feature is in particular advantageous when two different algorithms are applied for establishment of current loudness estimate and previous loudness estimates, respectively.

In an embodiment of the invention said means for scrolling comprises a user interface synchronized with a cursor CU which is movable relative to a time reference TR of the further part of said loudness meter A cursor may thus enable a user to scroll the previous loudness estimates in an intuitive and advantageous way.

In an embodiment of the invention, the time reference TR is represented as a non-linear reference scale.

In an embodiment of the invention said time reference TR is user selectable.

According to an embodiment of the invention, a user may choose between different time scales as well as linear or non-linear and/or zoom-ratio.

In an embodiment of the invention, said loudness meter controls means for playback MFP of an audio signal corresponding to or derived from said input signal IS by means of playback control signals PCS.

According to a further advantageous embodiment of the invention, audio playback may be synchronized with the input signal, thereby enabling a user to simultaneously listen and see the relevant parts of the audio in a real-time environment, i.e. whilst the audio is played.

In an embodiment of the invention said playback control signals PCS are synchronized with the current time value depicted by said means for scrolling means MFS.

According to a further embodiment of the invention, scrolling in the time window of previous loudness estimates PLE on said display means DM is synchronized with the playback of audio, thereby enabling a user to simultaneously listen and see the relevant parts of the audio.

In an embodiment of the invention, said scrolling is synchronized with the timing reference TR of said time window of previous loudness estimates PLE to indicate a current loudness estimate on said display means DM corresponding to a time chosen in said time window.

In an embodiment of the invention, said loudness meter enables a switching between scroll operation mode, where playback control signals PCS are synchronized with scrolling in the window of previous loudness estimates PLE and real-time operation mode.

According to a further advantageous embodiment of the invention, a user may switch the mode of the loudness meter between scroll-mode synchronized with the user scrolling and a real-time mode synchronized with the input signal. Moreover, a time slip function may be applied in the scroll mode for the purpose of catching up with the input signal.

In an embodiment of the invention, said input signal IS comprises a multi-channel signal MCS.

According to a further advantageous embodiment of the invention, the input signal may comprise a multi-channel or a multi-track signal which may be subject to an overall loudness estimation by the loudness meter, thereby obtaining e.g. one single loudness estimate at any time of the complete multi-channel signal.

In an embodiment of the invention said loudness estimate(s) PLE/CLE are established by said data-processing means DP, wherein said input signal IS comprises a multi-channel signal MCS and wherein said loudness estimate(s) is established on the basis of a combination of the loudness contribution of the individual signals of the multi-channel signal.

In an embodiment of the invention said loudness meter further comprises at least one further signal level indicator SLI.

Further signal-level indicators may e.g. include VU-meters, PPM-meters, and clipping indicators. The further signal-level indicators may e.g. reflect a measure or derivative of the complete input signal or e.g. supplement the loudness metering of the complete input signal by monitoring of individual channels or groups of channels. An example may e.g. relate to clipping, where it may become important for the user to associate clipping to the individual channels immediately.

In an embodiment of the invention, at least one of said loudness estimates are indicated on said display means as deviations from a loudness reference.

In an embodiment of the invention, said further part of said loudness meter indicates a time window of previous loudness estimates PLE on said display means DM as a polar representation where angle corresponds to time reference and radius is associated to loudness.

In an embodiment of the invention, said part of said loudness meter indicates a current loudness estimate CLE on said display means DM on a substantially circular scale surrounding said time window of previous loudness estimates PLE at least partly.

In an embodiment of the invention, the part of said loudness meter indicating a current loudness estimate CLE on said display means DM illustrates a one-dimensional indication.

In an embodiment of the invention, said further part of said loudness meter indicates said time window of previous loudness estimates PLE on said display means DM as a two-dimensional indication.

In an embodiment of the invention, said time window of previous loudness estimates PLE comprises means for indicating the estimates with reference to time on a visually quantized loudness scale.

According to a preferred embodiment, a visually quantized scale should enable a user to conceive the content and meaning of the time window of previous loudness estimates PLE in an easy and intuitive way. An example of such visual quantizing may include a color-coding of display areas indicating certain loudness levels.

In an embodiment of the invention, said time window of previous loudness estimates PLE comprises means for indicating the estimates with reference to time on at least two different visually quantized scales.

According to a further advantageous embodiment of the invention, different visually quantized scales should be available in order to fit into the actual requirements of the user. Thus, different scales may be available, automatically or manually chosen, for different purposes such as audio coded for mp3, CD, broadcast, etc. Thus, in one context, the signal levels of a certain upper interval may be color-coded by red, whereas the same color-coding may be applied to a broader part of the scale for another application.

Moreover, even further visually quantized scales may be applicable within the scope of the invention, e.g. by different types and shapes of the previous loudness estimating graphics.

In an embodiment of the invention, at least two different visually quantized scales are user selectable.

In an embodiment of the invention, said further part of said loudness meter indicates said time window of previous loudness estimates PLE on said display means DM as a function of time.

In an embodiment of the invention, the most recent of the previous loudness estimates PLE are visually emphasized over the earlier previous loudness estimates PLE.

In an embodiment of the invention, said further part of said loudness meter indicating said time window of previous loudness estimates PLE on said display means DM visually fades out the oldest of the previous loudness estimates on said display means such that the most recent of the previous loudness estimates PLE are visually emphasized over the earlier previous loudness estimates PLE.

In an embodiment of the invention, said further part of said loudness meter indicating said time window of previous loudness estimates PLE on said display means DM comprises a cursor indicating the current time.

In an embodiment of the invention, said loudness meter comprises a user interface.

FIGURES

The invention will now be described with reference to the drawings of which

FIG. 1 illustrates the basic principles of a preferred embodiment of a loudness meter and where FIGS. 2-6 illustrate different display layouts within the scope of the invention.

DETAILED DESCRIPTION

This loudness meter is intended to present the loudness of audio material in a form and by technical means superior to how traditional audio meters work.

The Loudness Meter displays several types of information, using different types of graphical approaches, integrated into a single display, as shown in the figures and explained below.

FIG. 1 illustrates the basic principles of a preferred embodiment of a loudness meter LM according to the invention. It should be stressed that some of the elements of the illustrated embodiment are very advantageous, but optional.

The loudness meter LM comprises data-processing means connected with a user interface. The user interface is connected with data-processing means DPM and provides control signals representing user settings of different user-configurable parameters such as time reference, scale type, zoom/zoom out, display configuration, etc. The user interface may comprise dedicated interface means such as button, switches, slides, sensors or more general purpose structures such as standard computer interfaces; keyboard, mouse, etc.

The data-processing means DPM may comprise hardware of a standard computer or dedicated hardware embedded in a stand-alone loudness meter application. The data-processing means may comprise one single unit or a distributed processing arrangement.

The data-processing means DPM are connected to a display DM for controlling of loudness indication responsive to an input signal IS.

The input signal IS may comprise an analog or a digitized audio signal or any derivative of representation thereof suitable for the purpose. The input signal may moreover or alternatively comprise or consist of loudness estimate representations.

The data-processing means may also establish a play-back control signal PCS, which may control or represent an audio playback signal which is synchronized with a timing reference chosen by a user of the user interface UI. Further explanation of how to choose this timing reference will be given below.

Moreover, and most important, the loudness meter comprises display means DM indicating loudness estimates on the basis of the input signal IS.

The display DM, which is indicated physically in FIG. 1, comprises a first part FIP and a further part FUP, both represented on the display as a physical area of any suitable shape and size. The first part FIP of the display of the loudness meter indicates a current loudness estimate and the further part FUP indicates a sequence or previous loudness estimates arranged in a time window according to a time scale. The time scale may comprise scale marks or indications or may just physically by size indicate the duration of time.

Other parts of the display DM area may e.g. be applied for further loudness indications or supplementary signal level indication, preferably responsive to the input signal IS.

The first part FIP of the display is thus applied for indicating a current loudness estimate, either directly synchronized with the input signal IS in the real-time mode or synchronized with a scroll control SC of the user interface SC in scroll-mode.

The further part FUP of the display is thus applied for, at the same time of the indication in the first part of the display to display a sequence of previous loudness estimates. The previous loudness estimates are visually indicated on the further part FUP of the display in order to provide an overall tracking of a time window, which may be fixed or chosen by a user by a scale selector SS of the user interface.

As mentioned above, this sequence of previous loudness estimates may serve as a visual tool enabling a user to conceive the loudness history and moreover to use this history as a time base for interactively using the scroll control SC to pin point particular time windows or a particular time at which the first part FIP of the display DM indicates a corresponding current loudness estimate.

According to a particular advantageous embodiment of the invention, the loudness estimate indicated in the first part FIP of the display is established by the data-processing means DPM according to one, typically short-term algorithm, and the loudness estimate indicated in the further part FIP of the display according to another, typically long-term algorithm, The user interface may moreover optionally comprise a first part control FIPC and a further part control FUPC. The first part control FIPC may e.g. enable control of the loudness algorithm applied for indication in the first part FIP of the display.

The further part control FUPC may e.g. enable control of the loudness algorithm applied for indication in the further part FUP of the display. Moreover, such control may include a layout type selector, e.g. enabling the user to choose between one of the time window layouts indicated in FIGS. 2-6. Furthermore, the user interface UI may enable recording and logging of the loudness history of several simultaneous sources, which the operator can then switch between.

Specific advantageous display layouts of the first part FIP and further part FUP will be given in FIG. 2-6.

Further configuring means of the user interface may e.g. enable a user to set up his own display layout on the basis of predefined selectable and configurable layouts of the first part FIP and further part FUP of the display.

According to a preferred embodiment of the invention, the loudness meter comprises one single stand-alone unit. According to a further embodiment, the functions of the loudness meter may be distributed between different and separated devices. According to a further embodiment, all loudness meters may be implemented on a general purpose platform, such as a PC.

The following advantageous display layouts of the first part FIP and further part FUP in FIGS. 2-6 are all indicated on a display controlled by data-processing means on the basis of an input signal IS according to relevant loudness algorithms. During description of the display layouts, references are made to the underlying hardware structure illustrated in FIG. 1.

FIG. 2 illustrates a preferred embodiment of a display layout of the first part FIP and further part FUP according to the invention.

The illustrated display of FIG. 2 comprises an outer circular display part forming the first part FIP.

This outer circular display shows the current loudness of the input signal IS according to a short-term loudness algorithm. If the sound has a constant loudness, this display remains fairly constant as opposed to traditional meters, which would change as a function of signal amplitude alone. The acceptable region of loudness in the first part FIP may be color-coded e.g. by green. If the short-term loudness of a program segment represented by an input signal IS indication remains within the green region; in this case −10 LU to +5 LU, where LU refers to a loudness unit suitable for the purpose, then the operator can easily determine that the material was neither too loud nor too soft. Accordingly, indications outside this region may be coded with another color to make a clear visual indication that the indication is not within the intended region. Evidently, the above-described color coding may be varied to fit the intended purpose.

In this context it should be noted that the eye is known to be more sensitive to angular movement than to linear movement. By using a circular display, the human operator can therefore quicker read the instant—current—value of the short-term loudness.

The center of the illustrated display of a loudness meter displays the loudness of the input signal during a past period, e.g. an hour, 30 minutes, 15 minutes or whatever period which is suitable for the purpose fixedly predefined or made user selectable. In other words, the center of the display corresponds to the previously described further part of the display.

In the figure the current loudness is being displayed at the “13 minutes past the hour” position. The older the long-term loudness entry is, the more it is faded into black (not shown). Thus, the long-term loudness display appears like “radar” scanning clock-wise. The current loudness measured by the long-term loudness algorithm may moreover be indicated by a cursor CU.

As an extra feature, the displayed long-term loudness can cover any period of time, from the past minute—time is zoomed in—to e.g. the past 2 hours—time is zoomed out. Time may be zoomed by the scale control SS. Furthermore, the illustrated loudness meter may record and log the loudness history of several simultaneous sources, which the operator can then switch between.

The further away from the center the long-term loudness graph is, the louder the sound was at that time. The different color regions correspond to signal present, SIP; below reference loudness, BRL; within desired loudness range, WDLR; and above reference loudness, ARL. The long-term loudness is calculated using a loudness algorithm which analyses the input source signal, but with a longer analysis window than the short-term loudness.

The display moreover comprises signal clip indicators SCI.

The signal clip indicator SCI, using e.g. a colored dot, may indicate any signal clips (on any channel) during illustrated time period. Different colors may be used to indicate other technical problems that happened in the past, such as signal drop out or loss of clock sync for a digital input. The signal clip indicators are thus referred to the same time scale as the time scale applied for the sequence or previous loudness estimates.

Textual information may moreover be displayed below in the graphical display to the mentioned loudness algorithm(s) applied, the source format, applied time scale or a current time indication.

The display layout may moreover comprise at least one instantaneous signal level indicator comprising a column of light emitting type components for each audio channel of the input source (not shown).

The illustrated display, which has been described in real-time mode above, may also be operated in a scroll-mode under control of the user by means of the scroll control SC of the user interface UI. In this mode, an operator may move the cursor through the available loudness history of previous loudness estimates with reference to the further part of the display and simultaneously see the current loudness estimate the outer circular display according to the algorithm applied for the establishment of loudness estimates on the outer circular display.

FIG. 3 illustrates a further embodiment of the invention where the outer circular display part forming the first part FIP corresponds to the illustrated display of FIG. 2.

Now, the further part FUP of the display comprises a cursor CU indicating the current time at the outer end of a moving spiral scale WS and the "oldest" time corresponding to the inner end of the moving spiral.

The moving spiral scale WS is color-coded and provided with an intuitive conceivable loudness history. Moreover, the color-coded moving spiral scale WS may be overlaid with signal clip indicators SCI indicating signal clipping according to the time scale of the moving spiral.

It is generally noted that the face of a clock may comprise a very advantageous and intuitive representation of both current and previous loudness estimates.

FIG. 4 illustrates a further embodiment of the invention.

The illustrated loudness meter comprises a display DM controlled by the already described data-processing means DP. The data-processing means establishes loudness estimates on the basis of the input signal IS and a first part FIP of the loudness meter indicates a current loudness estimate CLE on the display means DM. Moreover, at the same time, a further part FUP of the loudness meter indicates a time window of previous loudness estimates PLE on the display DM. The previous loudness estimates are illustrated with respect to a time reference, which may range a fixed period of e.g. 1 hour or range according to a user preference by means of the user interface. It is noted that the applied time scale is linear.

The progression with respect to the time reference TR should typically be synchronized with the input signal IS at each given time. Evidently, a complete batch mode may be applied together with scrolling for analyzing purposes.

The illustrated estimating in the further part FUP of the display illustrates the most recent loudness estimate at the very right part of the time window FUP. The estimate corresponds to the current value of the input signal. The display then shifts the previous loudness estimates to the left in synchronism with the input signal.

Figure 1:
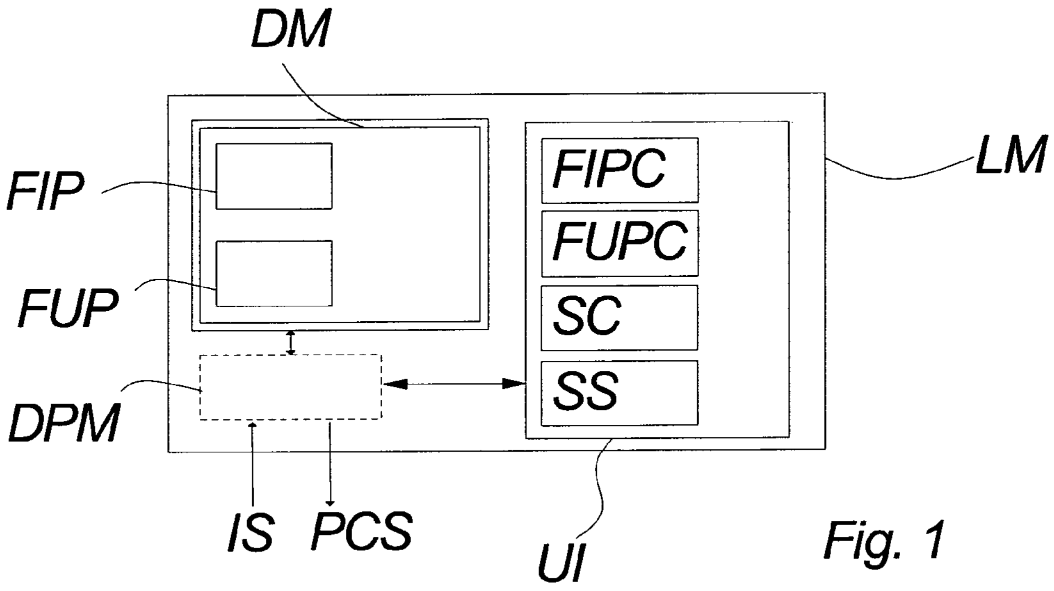
Figure 2:
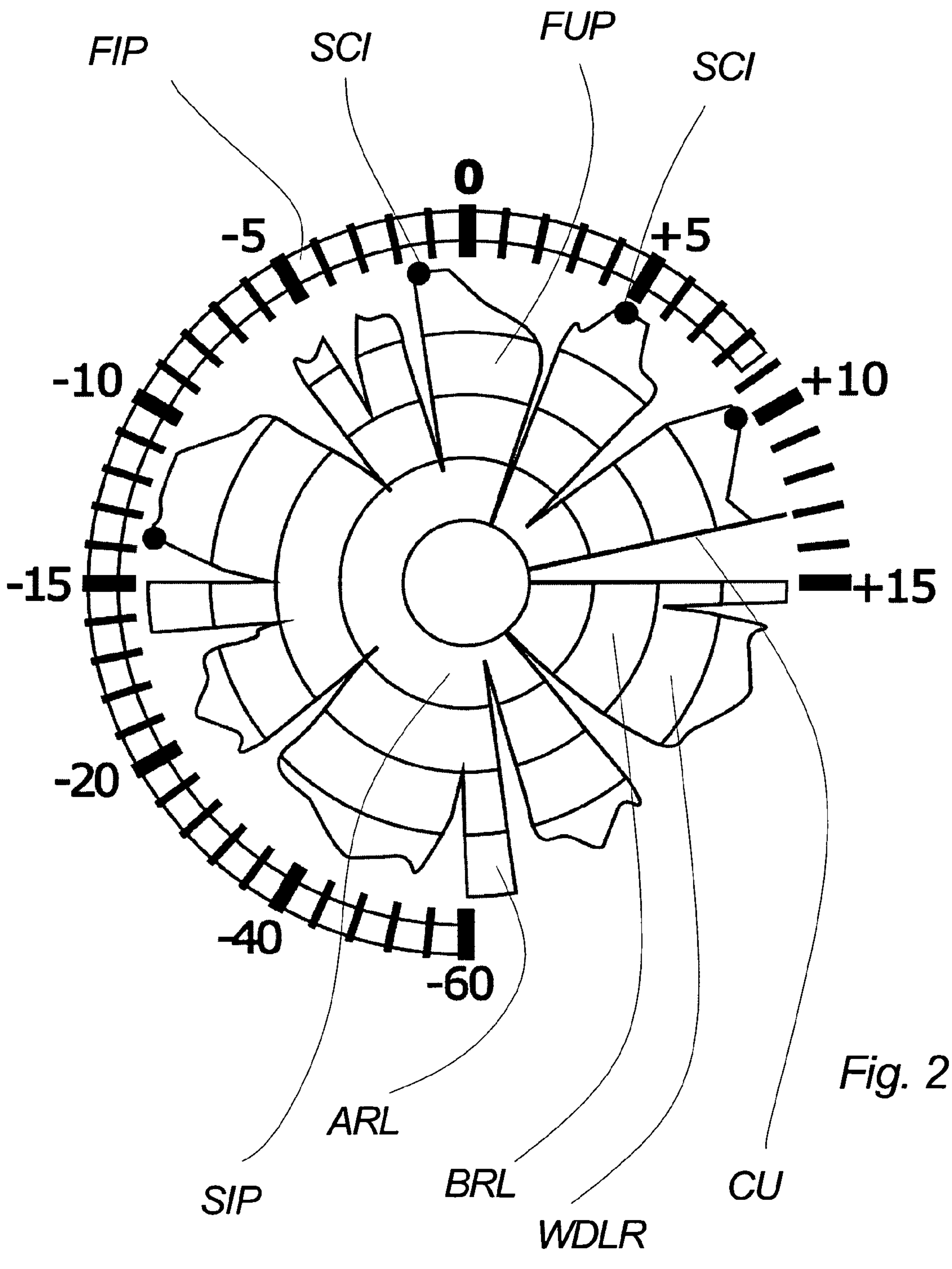
Figure 3:
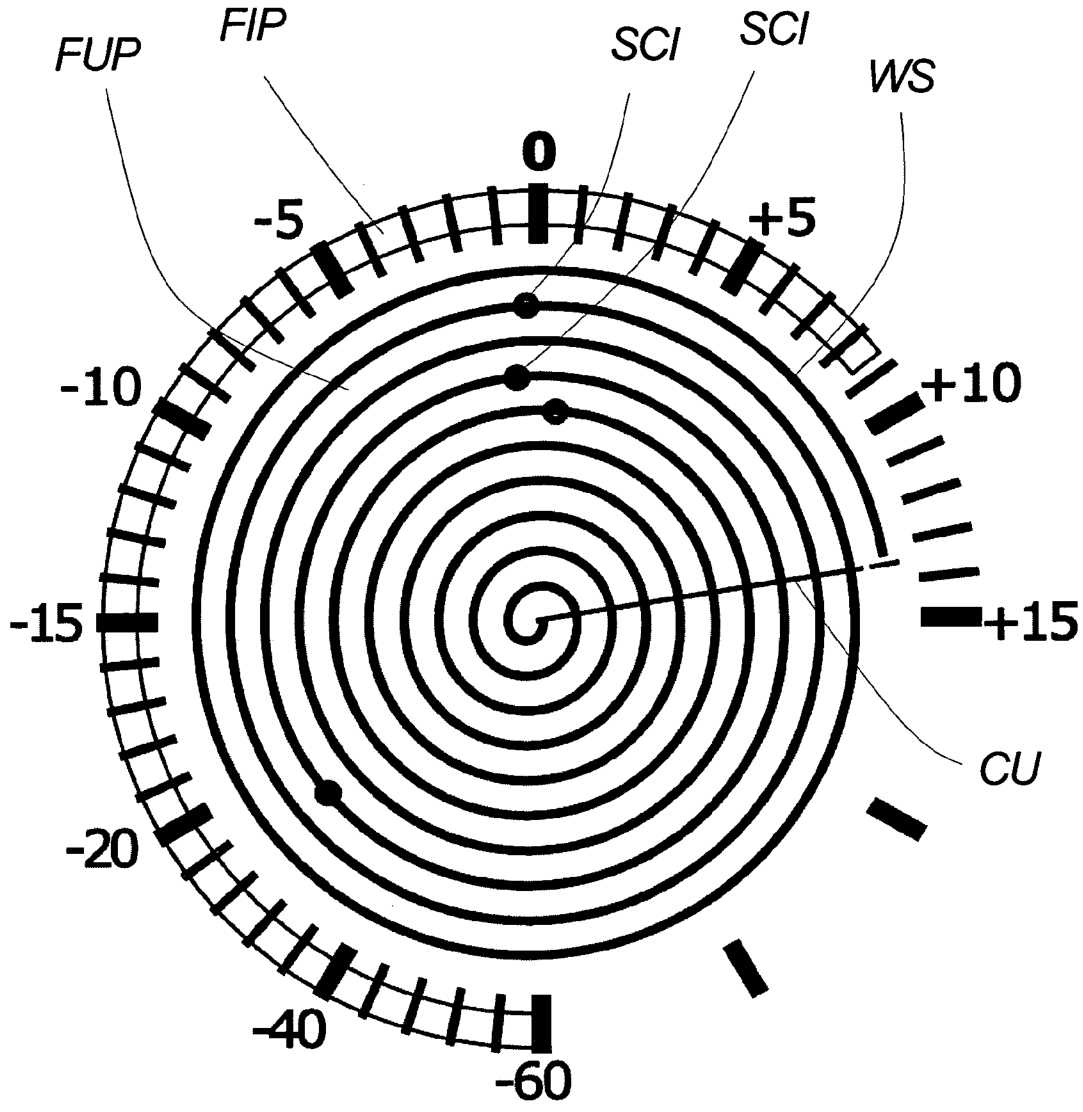
Figure 4:
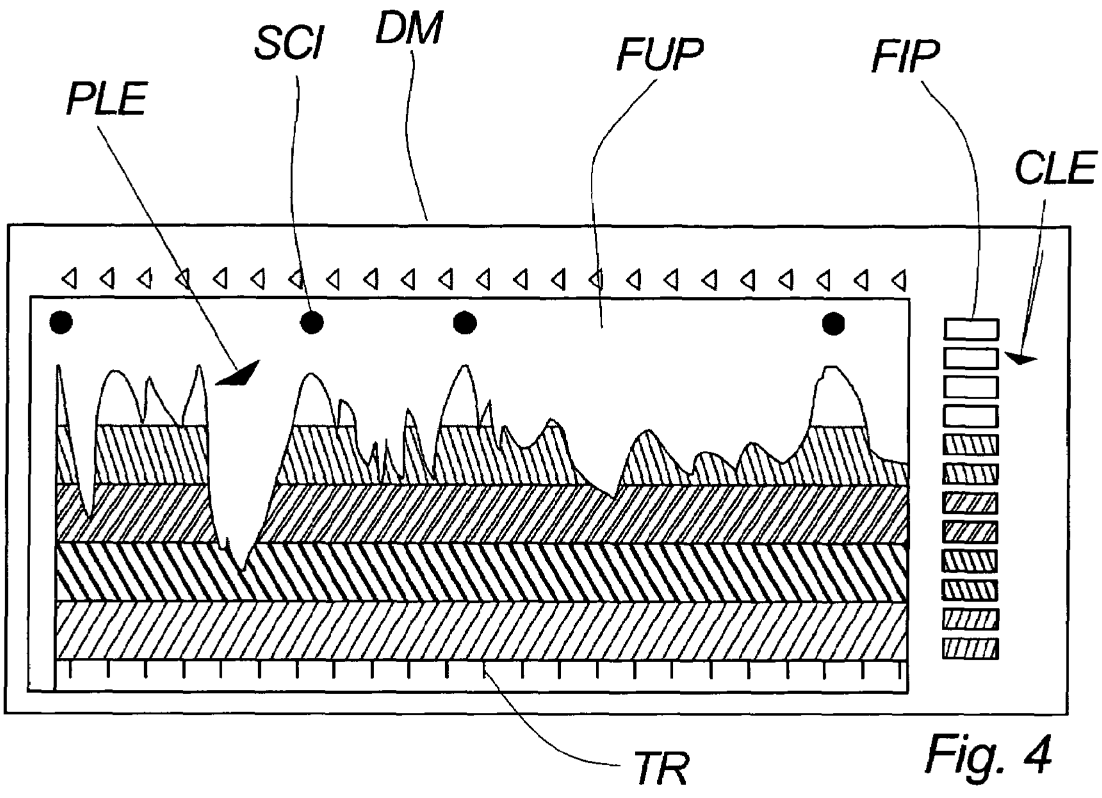
Figure 5:
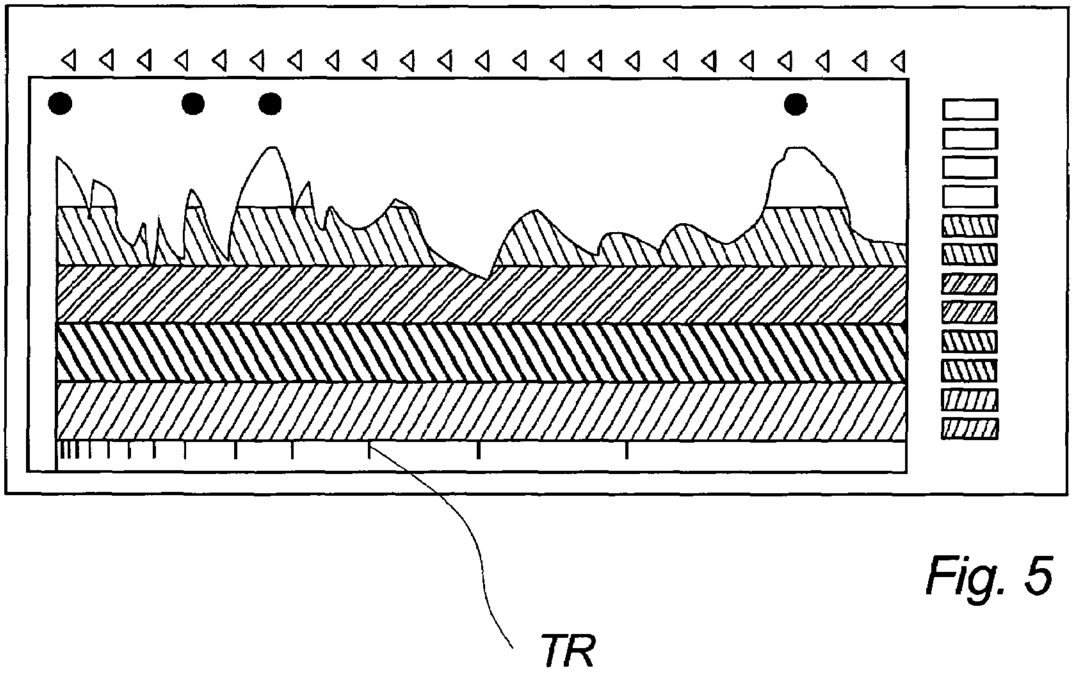
FIG. 5 illustrates a further embodiment of the invention where the time reference is displaying on a non-linear scale, thereby visually emphasizing the most recent loudness estimates in the further part of the display.
Figure 6:
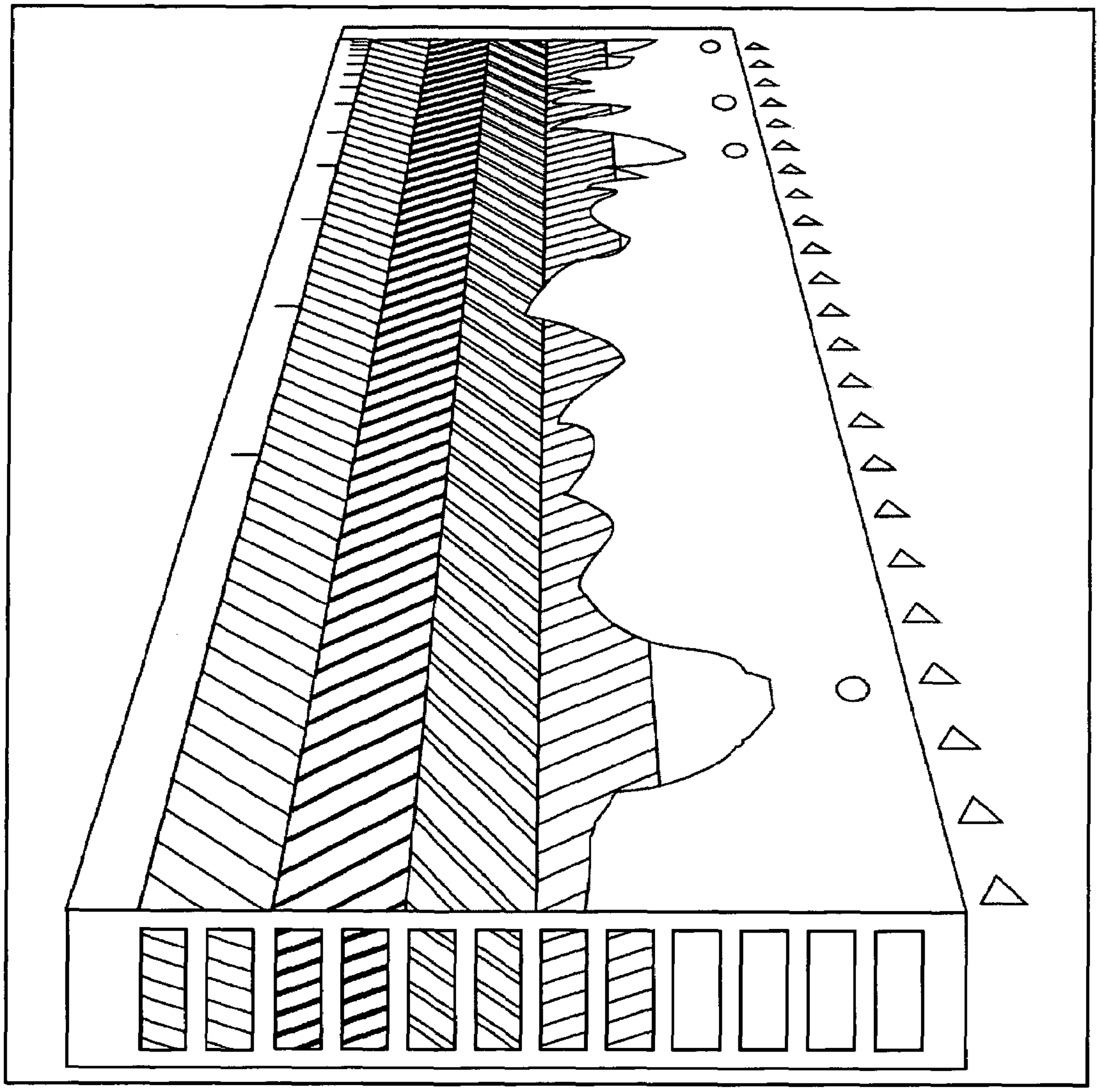
FIG. 6 illustrates a further embodiment of the invention where the time reference is displaying on a non-linear scale, thereby visually emphasizing the most recent loudness estimates in the further part of the display together with a 3D-like emphasis of the most recent loudness estimate in the further part of the display.

The invention claimed is:

1. Loudness meter comprising:

display means and data-processing means wherein said data-processing means establishes loudness estimates on the basis of an input signal, a first part of said loudness meter indicating a current loudness estimate on said display means, a further part of said loudness meter indicating a time window of previous loudness estimates on said display means, wherein said further part of said loudness meter indicates a time window of previous loudness estimates on said display means as a polar representation where angle is correlated to time reference and radius is associated to loudness.

2. Loudness meter according to claim 1, wherein said current loudness estimate is established by said data-processing means on the basis of a first loudness estimation algorithm and wherein said previous loudness estimate is established by said data-processing means on the basis of a further loudness estimation algorithm.

3. Loudness meter according to claim 1, wherein said current loudness estimate is established by said data-processing means on the basis of a short-term loudness estimation algorithm and wherein said previous loudness estimate is established by said data-processing means on the basis of a long-term loudness estimation algorithm.

4. Loudness meter according to claim 1, wherein said loudness meter comprises means for scrolling the time window of previous loudness estimates and wherein the indicated current loudness estimate corresponds to a loudness estimate at the time defined by said means for scrolling.

5. Loudness meter according to claim 4, wherein said means for scrolling comprises a user interface synchronized with a cursor which is movable relative to a time reference of the further part of said loudness meter.

6. Loudness meter according to claim 5, wherein the time reference is represented as a non-linear reference scale.

7. Loudness meter according to claim 5, wherein said time reference is user selectable.

8. Loudness meter according to claim 4, wherein said scrolling is synchronized with the timing reference of said time window of previous loudness estimates to indicate a current loudness estimate on said display means corresponding to a time chosen in said time window.

9. Loudness meter according to claim 1, wherein data-processing means of said loudness meter controls means for playback of an audio signal corresponding to or derived from said input signal by means of playback control signals.

10. Loudness meter according to claim 9, wherein said playback control signals are synchronized with the current time value depicted by said means for scrolling means.

11. Loudness meter according to claim 1, wherein said loudness meter enables a switching between scroll operation mode, where playback control signals are synchronized with scrolling in the window of previous loudness estimates and real-time operation mode.

12. Loudness meter according to claim 1, wherein said input signal comprises a multi-channel signal.

13. Loudness meter according to claim 1, wherein said loudness estimate(s) are established by said data-processing means, wherein said input signal comprises a multi-channel signal and wherein said loudness estimate(s) is established on the basis of a combination of the loudness contribution of the individual signals of the multi-channel signal.

14. Loudness meter according to claim 1, wherein said loudness meter further comprises at least one further signal level indicator.

15. Loudness meter according to claim 1, wherein at least one of said loudness estimates are indicated on said display means as deviations from a loudness reference.

16. Loudness meter according to claim 1, wherein said first part of said loudness meter comprises a substantially circular scale surrounding said time window of previous loudness estimates at least partly.

17. Loudness meter according to claim 1, wherein a part of said loudness meter indicating a current loudness estimate on said display means illustrates a one-dimensional indication.

18. Loudness meter according to claim 1, wherein said further part of said loudness meter indicates said time window of previous loudness estimates on said display means as a two-dimensional indication.

19. Loudness meter according to claim 1, wherein said time window of previous loudness estimates comprises means for indicating the estimates with reference to time on a visually quantized loudness scale.

20. Loudness meter according to claim 1, wherein said time window of previous loudness estimates comprises means for indicating the estimates with reference to time on at least two different visually quantized scales.

21. Loudness meter according to claim 20, wherein the at least two different visually quantized scales are user selectable.

22. Loudness meter according to claim 1, wherein said further part of said loudness meter indicates said time window of previous loudness estimates on said display means as a function of time.

23. Loudness meter according to claim 1, wherein the most recent of the previous loudness estimates are visually emphasized over the earlier previous loudness estimates.

24. Loudness meter according to claim 1, wherein said further part of said loudness meter indicating said time window of previous loudness estimates on said display means visually fades the oldest of the previous loudness estimates on said display means such that the most recent of the previous loudness estimates are visually emphasized over the earlier previous loudness estimates.

25. Loudness meter according to claim 1, wherein said further part of said loudness meter indicating said time window of previous loudness estimates on said display means comprises a cursor indicating the current time.

26. Loudness meter according to claim 1, wherein said loudness meter comprises a user interface.

* * * * *